(12) United States Patent
Block

(10) Patent No.: US 8,152,420 B1
(45) Date of Patent: Apr. 10, 2012

(54) DRILL BIT JIG

(76) Inventor: Michael Block, Phoenix, AZ (US)

( * ) Notice: Subject to any disclaimer, the term of this patent is extended or adjusted under 35 U.S.C. 154(b) by 1217 days.

(21) Appl. No.: 11/852,109

(22) Filed: Sep. 7, 2007

Related U.S. Application Data

(60) Provisional application No. 60/843,245, filed on Sep. 7, 2006.

(51) Int. Cl.
*B23B 47/28* (2006.01)

(52) U.S. Cl. .................. 408/115 R; 408/103

(58) Field of Classification Search .......... 408/115 R, 408/103, 97, 115 B, 72 B; 269/16, 22, 81, 269/87.1, 87.2, 87.3, 91, 108, 118, 119, 147, 269/219, 905, 165

See application file for complete search history.

(56) References Cited

U.S. PATENT DOCUMENTS

| 310,710 | A | | 1/1885 | Nichols | |
|---|---|---|---|---|---|
| 1,782,615 | A | * | 11/1930 | Hopwood | 269/98 |
| 2,260,784 | A | * | 10/1941 | Morton | 408/103 |
| 2,775,341 | A | | 12/1956 | Williams | |
| 2,814,219 | A | * | 11/1957 | Zern | 408/31 |
| 3,700,344 | A | * | 10/1972 | Grumbach | 408/108 |
| 4,204,785 | A | | 5/1980 | Rowlings | |
| 4,726,717 | A | | 2/1988 | Schmid | |
| 4,893,970 | A | * | 1/1990 | Becraft | 408/72 R |
| 5,056,966 | A | * | 10/1991 | Lee | 408/115 R |
| 5,407,307 | A | * | 4/1995 | Park | 408/115 R |
| 6,217,266 | B1 | | 4/2001 | Bowling | |
| 6,231,034 | B1 | * | 5/2001 | Walker et al. | 269/17 |
| 6,309,146 | B1 | * | 10/2001 | Lasseter | 408/1 R |
| 2005/0178686 | A1 | * | 8/2005 | Pangerc et al. | 206/379 |

FOREIGN PATENT DOCUMENTS

| FR | 2669251 A1 | * | 5/1992 |
|---|---|---|---|
| GB | 2203069 A | * | 10/1988 |
| GB | 2288356 A | * | 10/1995 |
| JP | 10217011 A | * | 8/1998 |
| WO | WO 8810177 A | * | 12/1988 |

OTHER PUBLICATIONS (http://web.archive.org/web/20061017032003/www.rockler.com/product.cfm?Offerings_ID=5876&TabSelect=Details), Mar. 29, 2006.*

* cited by examiner

*Primary Examiner* — Daniel Howell
*Assistant Examiner* — Paul M Janeski
(74) *Attorney, Agent, or Firm* — Schmeiser, Olsen & Watts LLP

(57) ABSTRACT

A drill bit jig includes an elongate member, two jig securing elements and a drill bit guide. The elongate member is hollow so that one or more elongate drill bits may be stored therein. The drill bit guide includes a plurality of through holes where the axes of the through holes are parallel to the axis of the elongate member. Each of the plurality of through holes in the drill bit guide has a different diameter for accommodating drill bits of different thicknesses. The jig securing elements each include an L-shaped bolt and a door protecting material encasing one of the straight sections of the bolt.

19 Claims, 9 Drawing Sheets

DRILL BIT JIG

CROSS REFERENCE TO RELATED APPLICATION

This application claims priority to U.S. Provisional Patent Application to Michael Block entitled "Drill Bit Jig", Ser. No. 60/843,245 filed Sep. 7, 2006, the disclosure of which is hereby incorporated entirely herein by reference.

BACKGROUND OF THE INVENTION

1. Technical Field

This invention generally relates to jigs and more particularly to jigs for positioning and guiding drill bits and methods for using such jigs to drill elongate holes without marring a surface of a work piece.

2. State of the Art

In the past, technicians installing security systems on doors have used line of sight to align a bit during hand drilling of a hole in a generally widthwise direction from a hinge area to a bolt area of a security door. Often this method of "eye-balling" has resulted in ruining or damaging the door by drilling through a front or rear surface of the door.

DISCLOSURE OF THE INVENTION

The present invention relates generally to jigs and more particularly to jigs for positioning and guiding drill bits during a drilling operation.

In a simple form, the present invention may include a jig having an elongate member with a longitudinal axis. The jig, may also include at least one adjustable jig securing element adjustably supported on the elongate member. The jig may also include at least one bit guide piece protruding transversely relative to the elongate member. The jig may also have structure in the bit guide piece that forms a through opening in the bit guide piece. The through opening may extend lengthwise in a direction generally parallel to the longitudinal axis of the elongate member.

The jig securing element may include an L-shaped bolt passing through the elongate member. An elbow portion and a shorter straight section of the L-configured bolt may extend transversely on a first clamping side of the elongate member while a longer straight section of the L-configured bolt may extend transversely on a second tightening side of the elongate member. At least a portion of the longer straight section may be threaded. A threaded knob or nut may be received on threads of the straight threaded portion. The threaded knob or nut may be turned in a first direction to draw the bolt through the sliding piece in a first tightening direction transverse to the longitudinal axis of the elongate member and to extend the bolt through the sliding piece in an opposite second loosening direction that is also transverse to the longitudinal axis.

The jig may include two jig securing elements substantially similar to the jig securing element described above. Thus, the elbow portion of respective jig securing elements may be engaged on opposite edges of a work piece to be drilled.

The bit guide may be incorporated into one or more blocks or plates. The block may extend transverse to the elongate member on the first clamping side of the jig. Thus, when the jig is secured to the work piece, the bit guide may be aligned so that the through hole lies in a plane of the work piece. By aligning the elongate member along a line to be drilled through the work piece, the bit guide may be placed to guide a bit through the work piece along a predetermined line during drilling. Thus, errors in drilling may be avoided.

It is to be understood that several holes of a variety of sizes and/or positions may be provided in the block that incorporates the bit guide. Thus, a user may select any of a variety of bit sizes and may drill at any of a variety of locations to accommodate different applications and different thicknesses of work pieces.

In another simple form, a method of drilling through a width of a work piece in accordance with the present invention may include aligning a jig with a desired line of drilling. The method may include securing the jig to the work piece. The method may include inserting a drill bit through a desired bit guide secured to or forming part of the jig. The method may include drilling widthwise through the work piece along the line of drilling.

The method enables drilling through the width of the work piece without accidentally penetrating a surface in a thickness direction of the work piece. The work piece may be a door having a height and a thickness in addition to a width. The line of drilling may be any transverse direction relative to a height dimension of the door. Alternatively, the jig may be used to drill in a height direction of the door. The present invention enables drilling through a width, a height, or any diagonal direction between a width and a height without penetrating through a front or a rear surface of the door. Overall, the jig of the present invention may be used to drill in any direction or any plane of the door.

The method may include aligning an elongate member in an aligned position relative to a line to be drilled on the work piece. The step of securing may include clamping the elongate member in the aligned position. The step of aligning may include aligning a through hole in the bit guide with a desired location on a thickness of the work piece to be drilled. The step of securing may include aligning a longitudinal axis of the through hole in the bit guide with a longitudinal axis of the elongate member in a generally parallel relationship. The step of aligning may include selecting a through opening from among a plurality of through holes in the bit guide and inserting a drill bit through the selected through opening. Alternatively or additionally, the step of aligning may include placing one or more spacers between the elongate member and a clamping knob of the jig securing element to accommodate work pieces of varying thicknesses.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to jigs in general and more specifically to jigs for positioning and guiding drill bits and methods for using such jigs to drill elongate holes without marring a surface of a work piece.

Figure 1A:
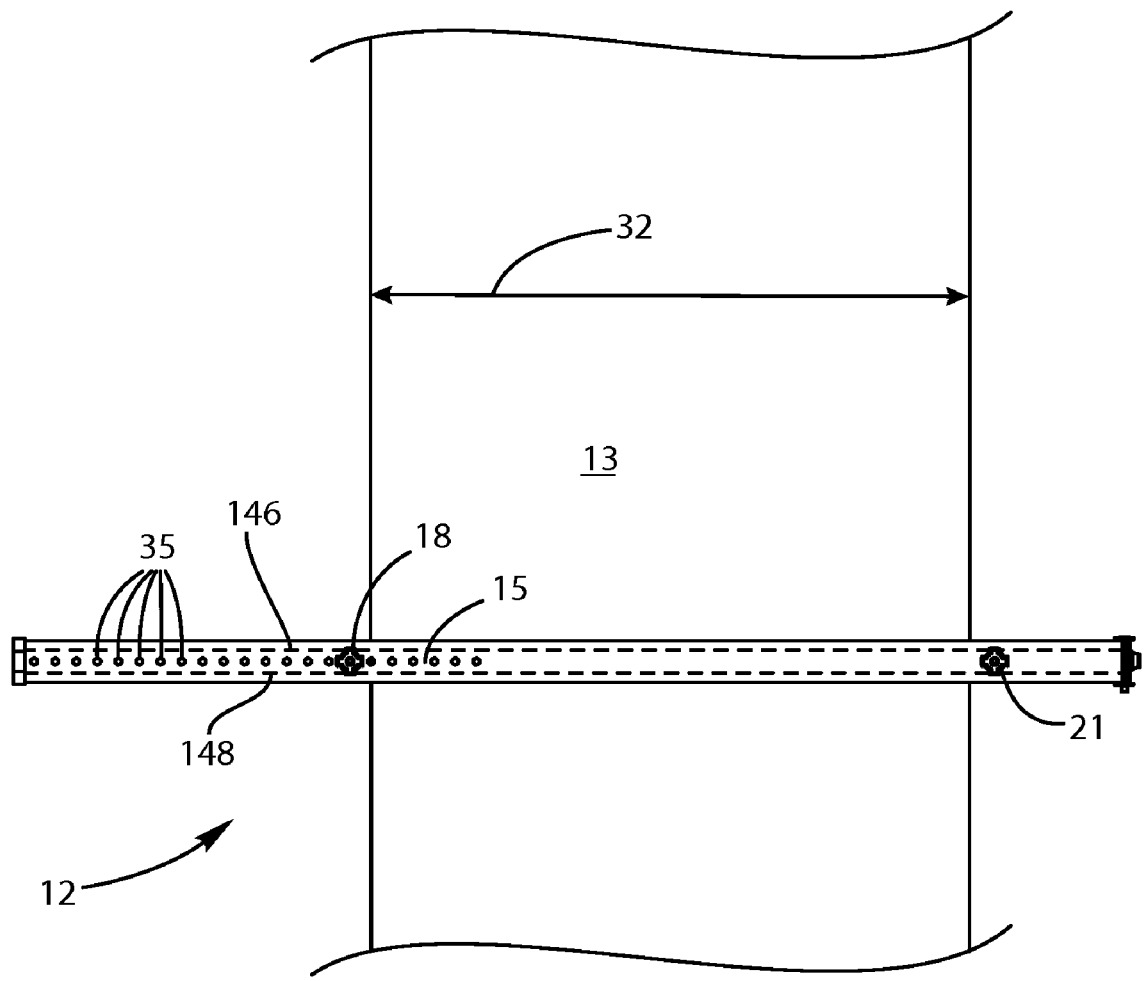
FIG. 1A is a front elevational view of a jig, in accordance with the present invention.
Figure 1B:
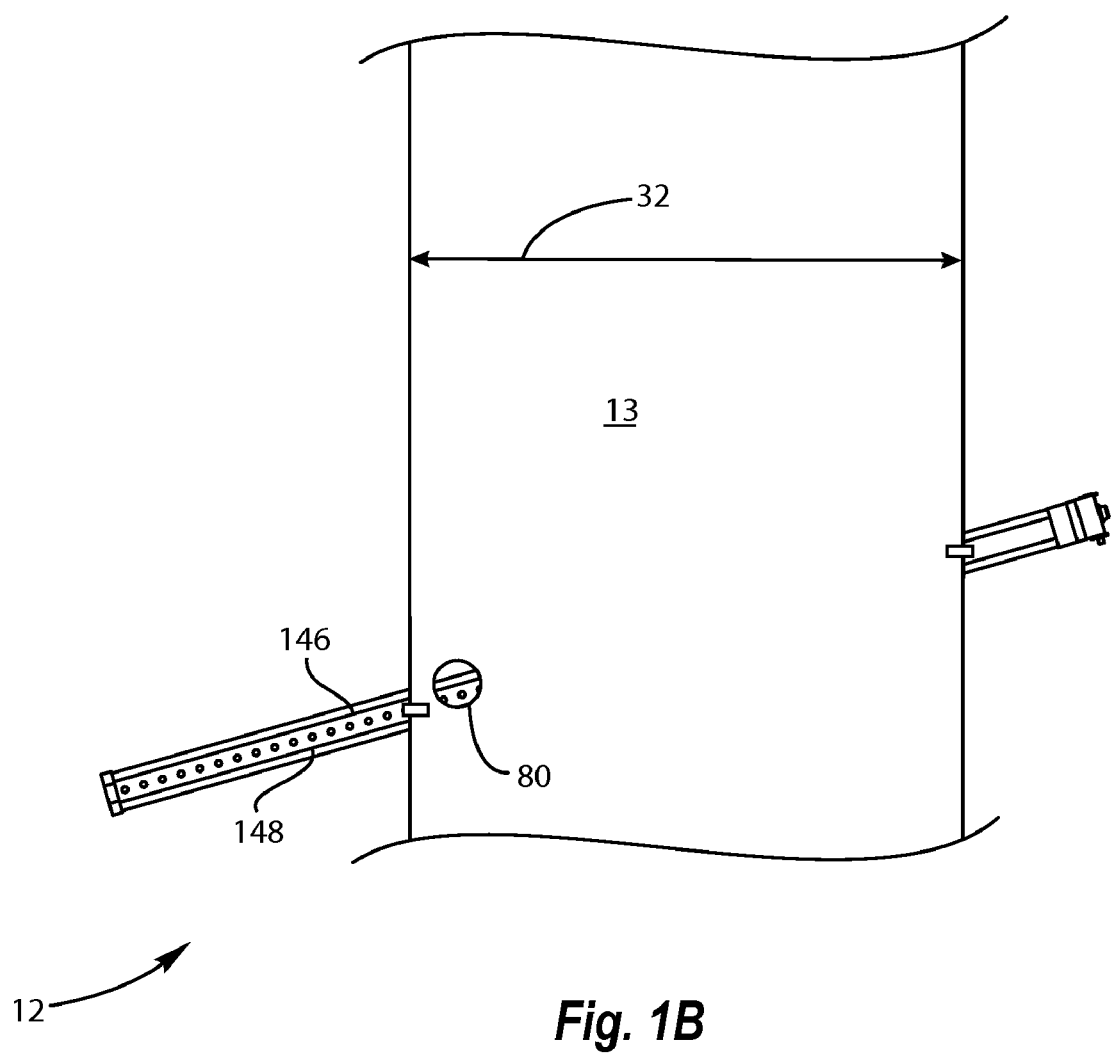
FIG. 1B is a rear elevational view of a jig, in accordance with the present invention.
Figure 2:
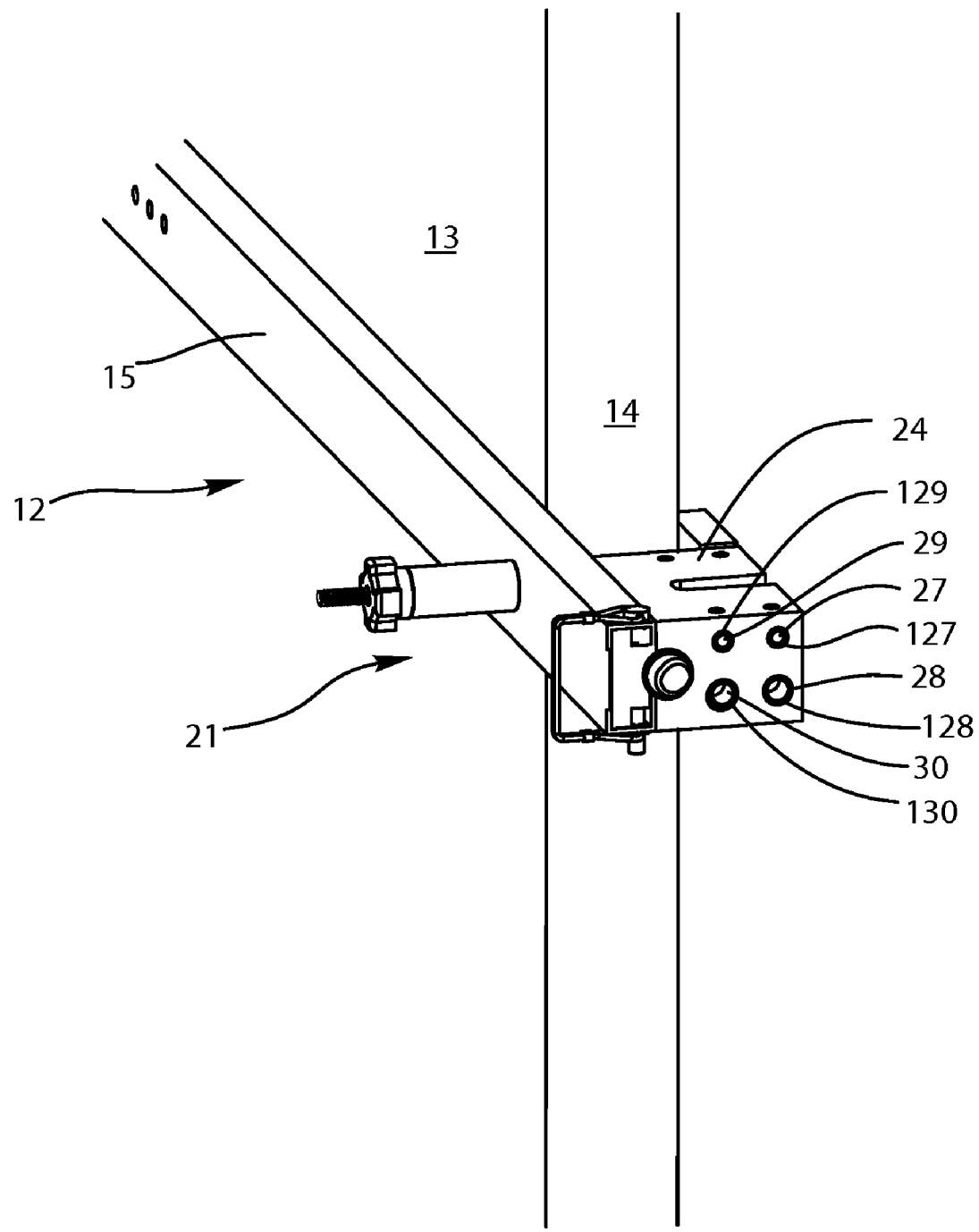
FIG. 2 is a perspective view of a first end of the jig and a drill bit guide, in accordance with the present invention.
Figure 3:
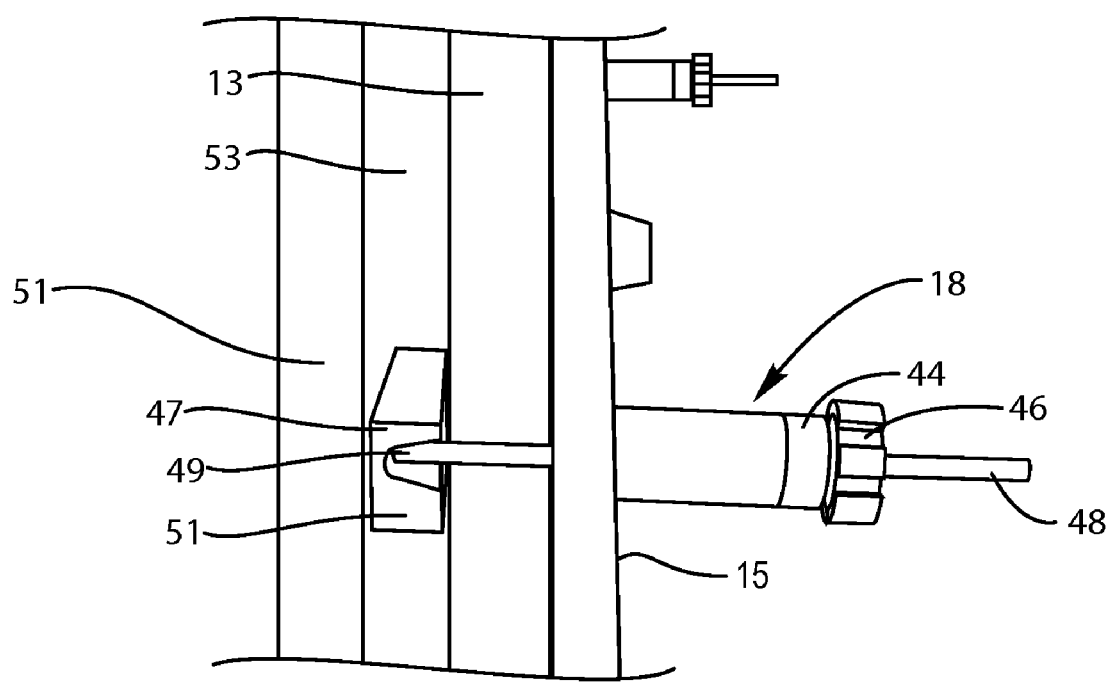
FIG. 3 is a perspective view of a second end of the jig, in accordance with the present invention.

FIGS. 1-3 show a jig 12 secured to a door 13. The jig 12 includes an elongate member 15, two jig securing elements 18 and 21, and a bit guide 24. In practice, the knob (not shown) and a hinge (not shown) would be removed and the elongate member 15 would be aligned with the opening 80 in the door 13 that receives the knob. Then a hole would be drilled in a generally widthwise direction from the hinge mounting area to the knob area. Then wiring for carrying security signals could be placed in the hole.

The jig 12 may be secured to the door 13 with the bit guide 24 aligned so that the through hole lies in a plane of the work piece. By aligning the elongate member along guide lines 146 and 148 aligned with holes of the bit guide 24. The bit guide 24 may be placed to guide a bit through the work piece along one of the guide lines 146 or 148 during drilling. Thus, errors in drilling may be avoided. One of the guide lines 146 and 148 may be viewable through the opening 80 to ensure that the hole is drilled to the opening 80.

At least one of the jig securing elements 18, 21 is adjustable along a length of the elongate member 15. In a particular embodiment, shown in FIG. 1, jig securing element 18 is adjustable along the length of the elongate member 15 by providing a plurality of through holes 35 in the elongate member 15. In this embodiment, the jig securing element 18 may be positioned in any one of the plurality of through holes 35 to accommodate doors of different widths. Alternatively, the jig securing element 18 may be adjustable by, for example and without limitation, replacing the through holes 35 with an elongate channel such that the jig securing element 18 may slide along the channel, or providing a jig securing element that surrounds the elongate member 15 and is thus slidable along the outside of the elongate member 15. In a still further example, either one or both of the jig securing elements 18 and 21 may be adjustable using any of the configurations discussed above at one or both ends of the elongate member 15.

FIG. 2 depicts the jig securing element 21 that is proximate to the bit guide 24. The bit guide 24 is shown extending transversely from the elongate member 15 and positioned in alignment with the thickness aspect 14 of the door 13. The drill bit guide 24 may be rigidly attached to the elongate member 15 using any effective attachment means. For example and without limitation, the drill bit guide 24 may be attached to the elongate member 15 by screws, bolts, welding, adhesive, etc. The through openings 27, 28, 29 and 30 that form part of the bit guide 24 have longitudinal axes that are aligned parallel to a longitudinal axis of the elongate member 15. Thus, when a bit is guided through one of the openings 27, 28, 29 and 30 in the bit guide 24 and drilled through the door 13, the bit can remain aligned in a plane generally parallel to the door 13 and avoid damage or ruin to the door 13 by the bit coming out through the front or rear face of the door 13 in a thickness direction.

Figure 6:
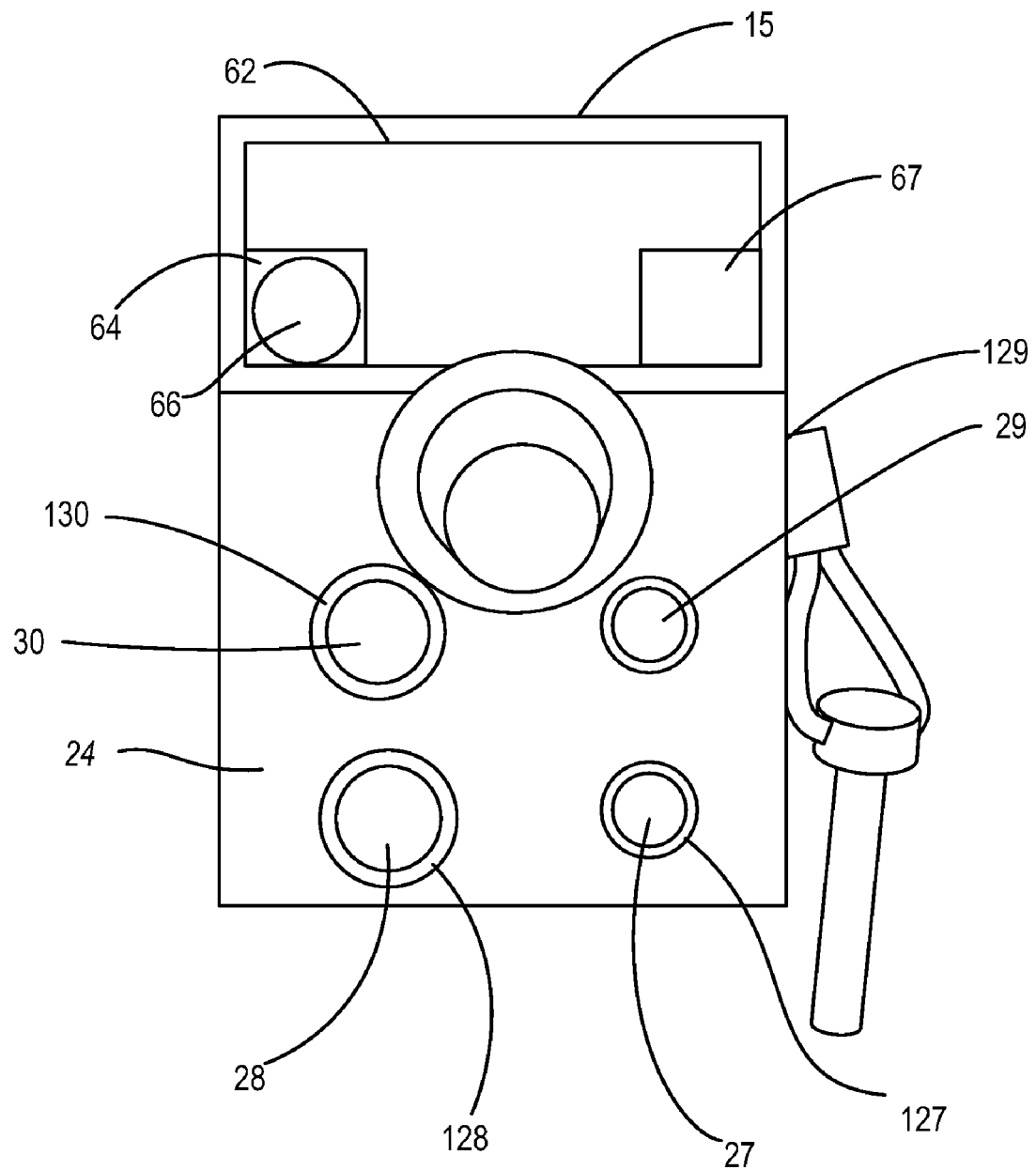
FIG. 6 is a side elevational view the first end of the jig, in accordance with the present invention.

As shown in FIGS. 2 and 6, the through openings 27, 28, 29 and 30 may have bushings or liners 127, 128, 129 and 130 to protect the through holes 27, 28, 29 and 30 against premature wear. Also, the bushings 127, 128, 129 and 130 may advantageously provide reduced friction between the bits and the jig 12 during drilling.

In the particular embodiment shown in FIG. 2, there are two sets of through openings in the bit guide 24 and each set includes two through openings with different diameters to accommodate two different sizes of drill bits. Through openings 27 and 28 are a first set of openings and through openings 29 and 30 are a second set of through openings, where through openings 27 and 29 have smaller diameters than through openings 28 and 30. Through openings 27 and 29 have substantially equal diameters and through openings 28 and 30 have substantially equal diameters. Thus, depending on the thickness of the door, a user can choose where to position the hole to be drilled by choosing one of the sets of through openings. Thus, the drill bit guide 24 can accommodate drill bits of a variety of sizes. Specifically, the drill bit guide 24 can accommodate drill bits with outer diameters that are slightly smaller than the inner diameters of the through openings 27, 28, 29 and 30. It should be noted that the drill bit guide 24 may have more or less than two sets of through openings and that each set may include more or less than two through openings. For example, the drill bit guide 24 may include three sets of through openings with three through openings in each set.

Figure 4:
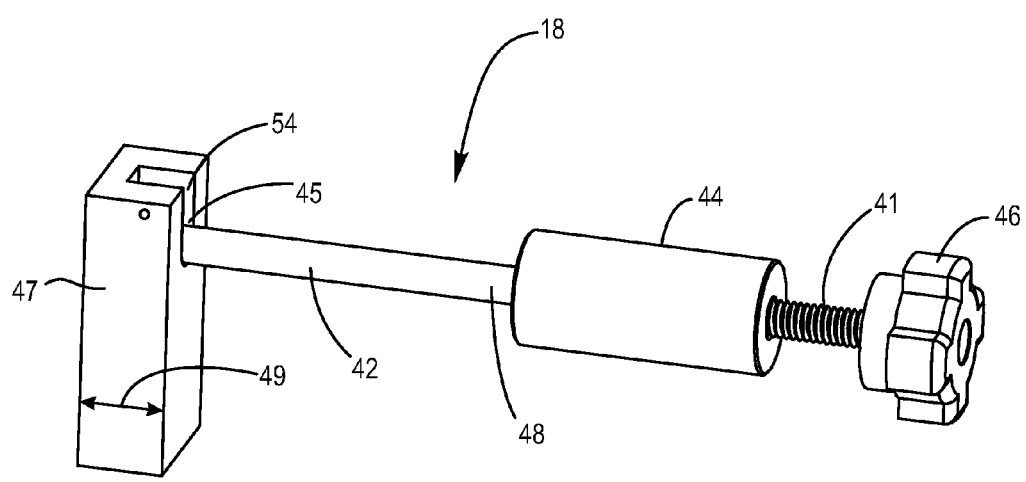
FIG. 4 is a perspective view of a jig securing element, in accordance with the present invention.

FIG. 4 is a detailed view of the jig securing element 18. It should be understood that the jig securing element 21 is substantially identical to jig securing element 18. The jig securing element 18 includes an L-shaped bolt 42 with an elbow portion 45, a longer straight section 48 and a shorter straight section encased by a door protecting material 47. At least part of the longer straight section 48 may have threads 41 that receive a clamping knob 46. The jig securing element 18 further includes a spacer 44 to accommodate different work piece thicknesses and to ensure that the threaded portion 41 of the bolt 42 does not pass through the holes 35 and 36 (shown in FIG. 7) in the elongate member 15 during clamping.

Figure 5:
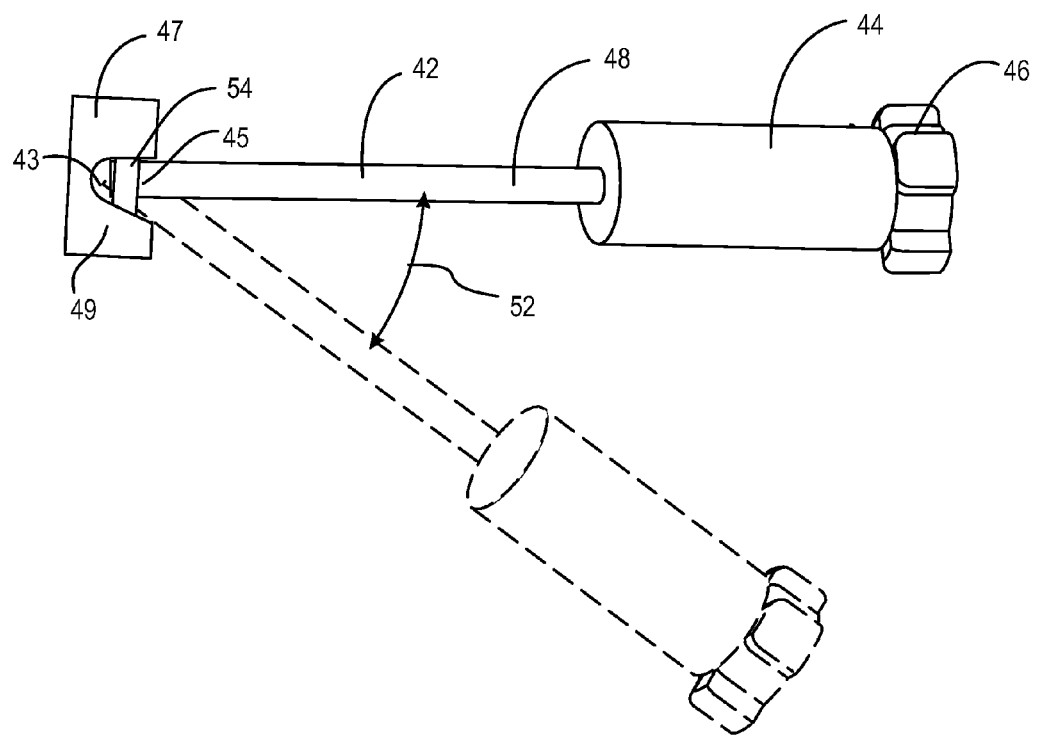
FIG. 5 is a top plan view of the jig securing element, in accordance with the present invention.

The material 47 may be generally rectangular and may be made of, for example and without limitation, plastic, UHMW plastic, polyethylene, wood, vinyl, polymer or any other material that will not cause damage to the surface of the door 13 during clamping engagement of the jig 12 on the door 13. In an alternative embodiment, the jig securing elements 18 and 21 may be provided without the door protecting material so that the shorter straight section of the L-shaped bolt 42 is in direct contact with the surface of the door when the jig 12 is in the clamped position. In the embodiment shown in FIGS. 4 and 5, the L-shaped bolt 42 is slightly pivotable within the protecting material 47 because an opening 43 in which the shorter straight section is disposed is larger than the diameter of the bolt 42. A bar 54 retains the bolt 42 within the protecting material 47. FIG. 5 is a top plan view showing the angle 52 through which the bolt 42 may pivot. As shown in FIG. 3, the thickness 49 of the protecting material 47 is such that the generally rectangular piece of protecting material 47 may fit in the opening 53 between the door 13 and the door jamb 51.

Referring again to FIGS. 1-3, the jig 12 is secured to the door 13 by positioning the jig securing elements 18 and 21 in through holes in the elongate member 15. Specifically, the long portion 48 of the L-shaped bolt 42 of jig securing element 18 passes through one of the plurality of through holes 35 disposed in one end the elongate member 15 and the long portion 48 of the L-shaped bolt 42 of jig securing element 21 passes through a through hole 36 (see FIG. 7) in the other end of the elongate member 15. The one of the plurality of through holes 35 through which the jig securing element 18 passes is chosen based on the width of the door 13 to be drilled. Thus, the jig 12 may be adjusted to be fittingly secured to doors having any of a variety of widths generally corresponding to a dimension 32. The elongate member 15 is in contact with a first surface of the door 13. The protecting material 47 and the shorter straight sections of the L-shaped bolts 42 encased therein are in contact with a second surface of the door 13. The position of the jig 12 is maintained by tightening the clamping knobs 46 on the threaded sections 48 of the bolts 42 of the jig securing elements 18 and 21 such that the door 13 and the elongate member 15 are clamped between the protecting material 47 and the spacers 44. Due to the length of the threaded section 41 and the spacer 44, the jig 12 may be adjusted to be fittingly secured to doors having any of a variety of thicknesses generally corresponding to a dimension 14.

As may be appreciated, the elongate member 15 may be formed of a generally hollow rectangular member that includes a plurality of through holes 35 and 36 (shown in FIG. 7) extending through the elongate member 15 in a direction that is transverse to the longitudinal axis of the elongate member 15. In a particular embodiment, the hollow rectangular member may be configured to support one or more bits within the jig 12. In another particular embodiment, shown in FIG. 6, the hollow member is filled with a protective filling material 62 that includes holes 64 therein for containing the bits 66. In the embodiment shown in FIG. 6, there are two holes 64, but it should be understood that the material 62 may contain more or less holes of varying sizes, depending on the number and size of the bits. Thus, a user may have an option for bit sizes and may enjoy the convenience of having the bits 66 kept together with the jig 12. Furthermore, the bits 66 are protected from any marring and users are protected from injury by the bits 66. The bits 66 used in widthwise drilling applications must be free from damage on the bit tips in order to be capable of drilling an entire width without deviating and coming out through a front or rear surface of the door in a thickness direction.

Figure 7:
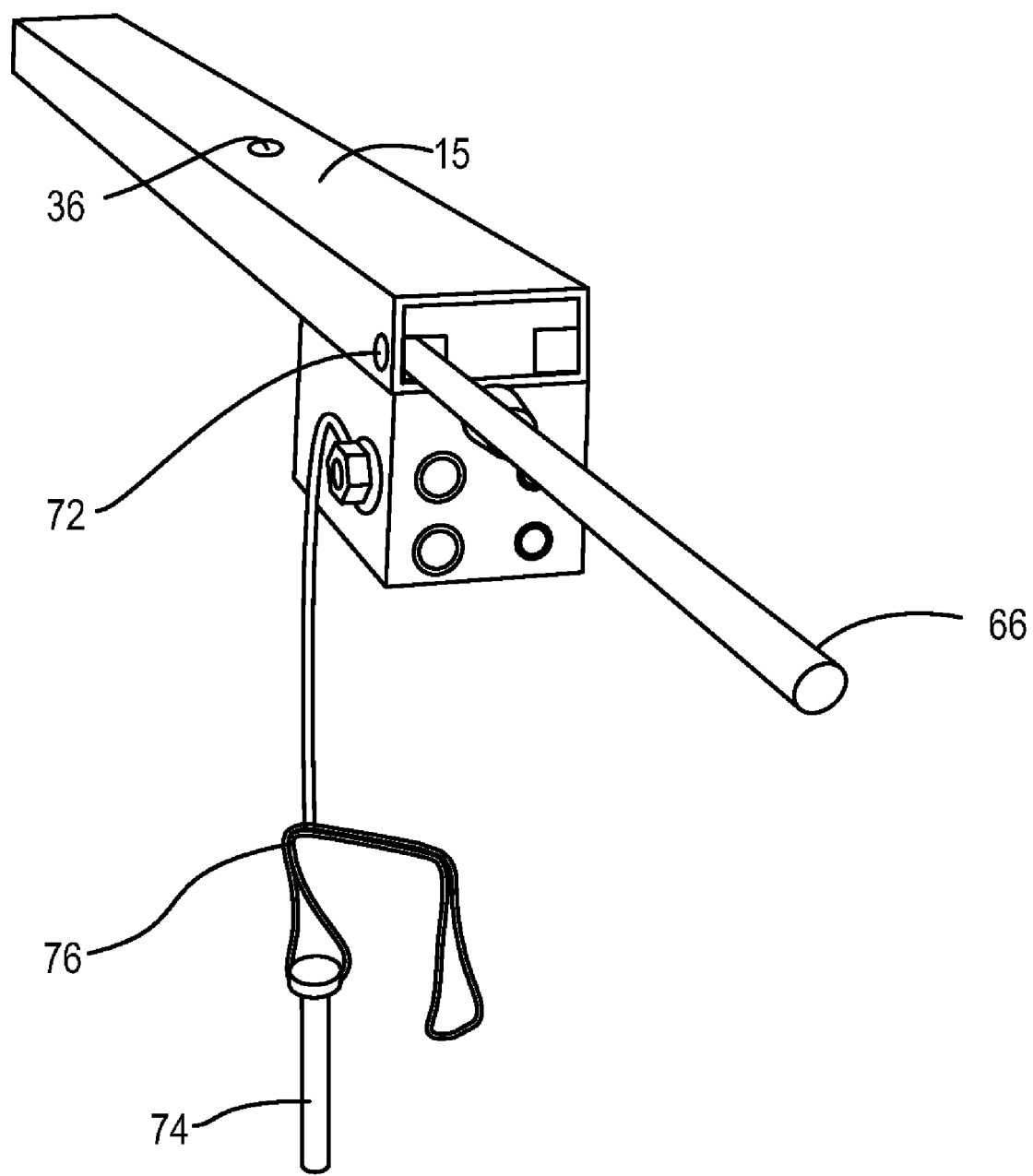
FIG. 7 is a perspective view of the first end of the jig with a bit partially removed, in accordance with the present invention.
Figure 8:
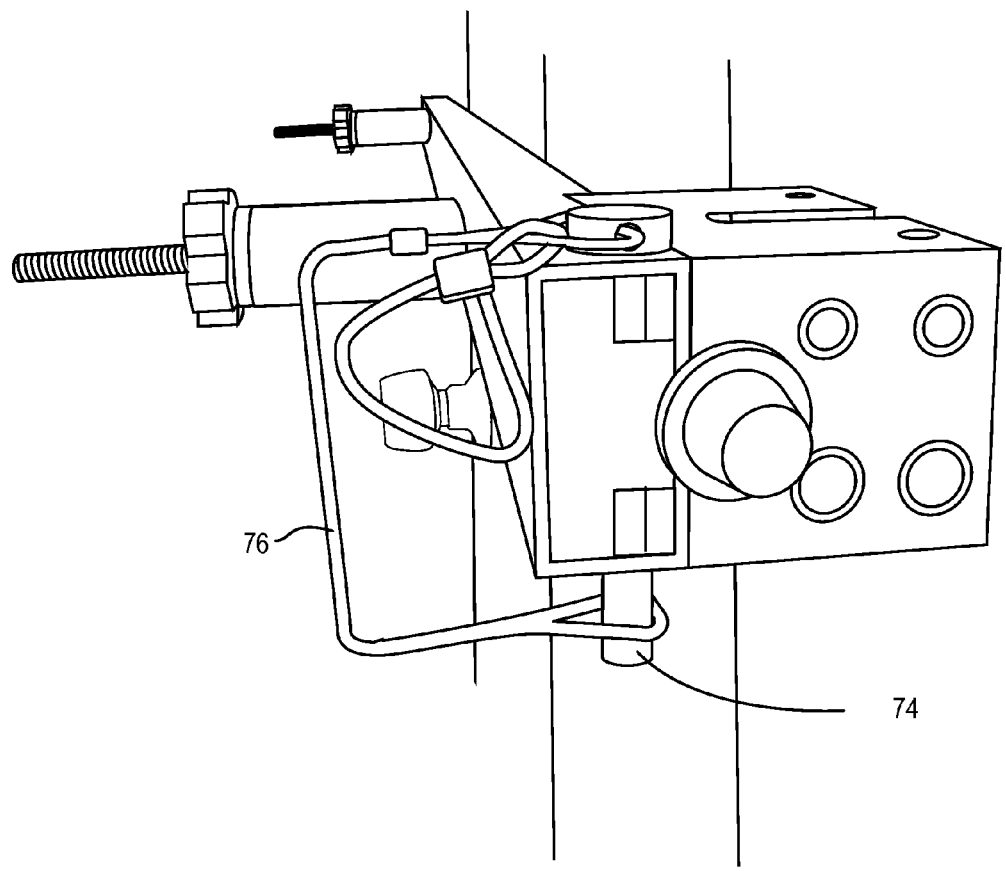
FIG. 8 is a perspective view of the first end of the jig with a locking pin in place, in accordance with the present invention.

FIG. 7 shows the bit 66 in a partially protracted state relative to the stowed condition when completely inside the elongate member 15. In order to maintain the bits 66 within the elongate member 15 during storage and/or transport, a pin 74 is positioned within the through hole 72. After positioning the pin 74 in the through hole 72, the pin 74 may be locked in place with locking mechanism 76 as shown in FIG. 8. It should be understood that the pin 74 and locking mechanism 76 are provided as examples, but any other effective configuration could be used to maintain the position of the bit 66 within the elongate member 15 during storage.

Figure 9:
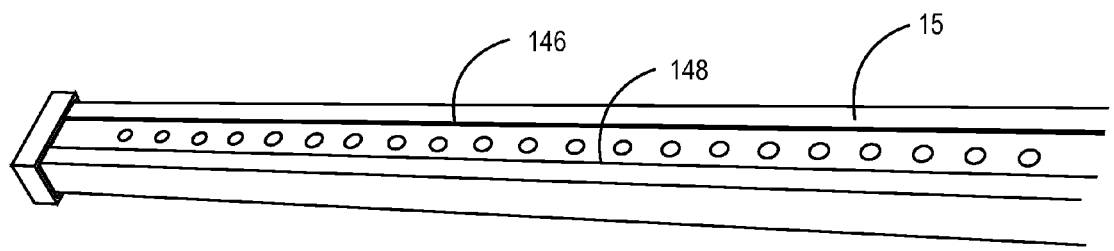
FIG. 9 is a perspective view of a back side of the second end of the jig, in accordance with the present invention.

As shown in FIG. 9, guide lines or scores 146 and 148 may be inscribed or scored onto the elongate member 15 on the end of the elongate member 15 that is distal from the bit guide 24. The guide lines are in alignment with respective through openings 27, 28, 29 and 30 in the bit guide 24. Similar lines or scores may be placed on an adjacent lateral face of the elongate member 15 for sighting from that side by a user during positioning of the jig 12 on a door. However, since the elongate member 15 will generally extend beyond the widthwise edges of the door, the scores or lines shown in FIG. 9 may be sufficient.

Figure 10:
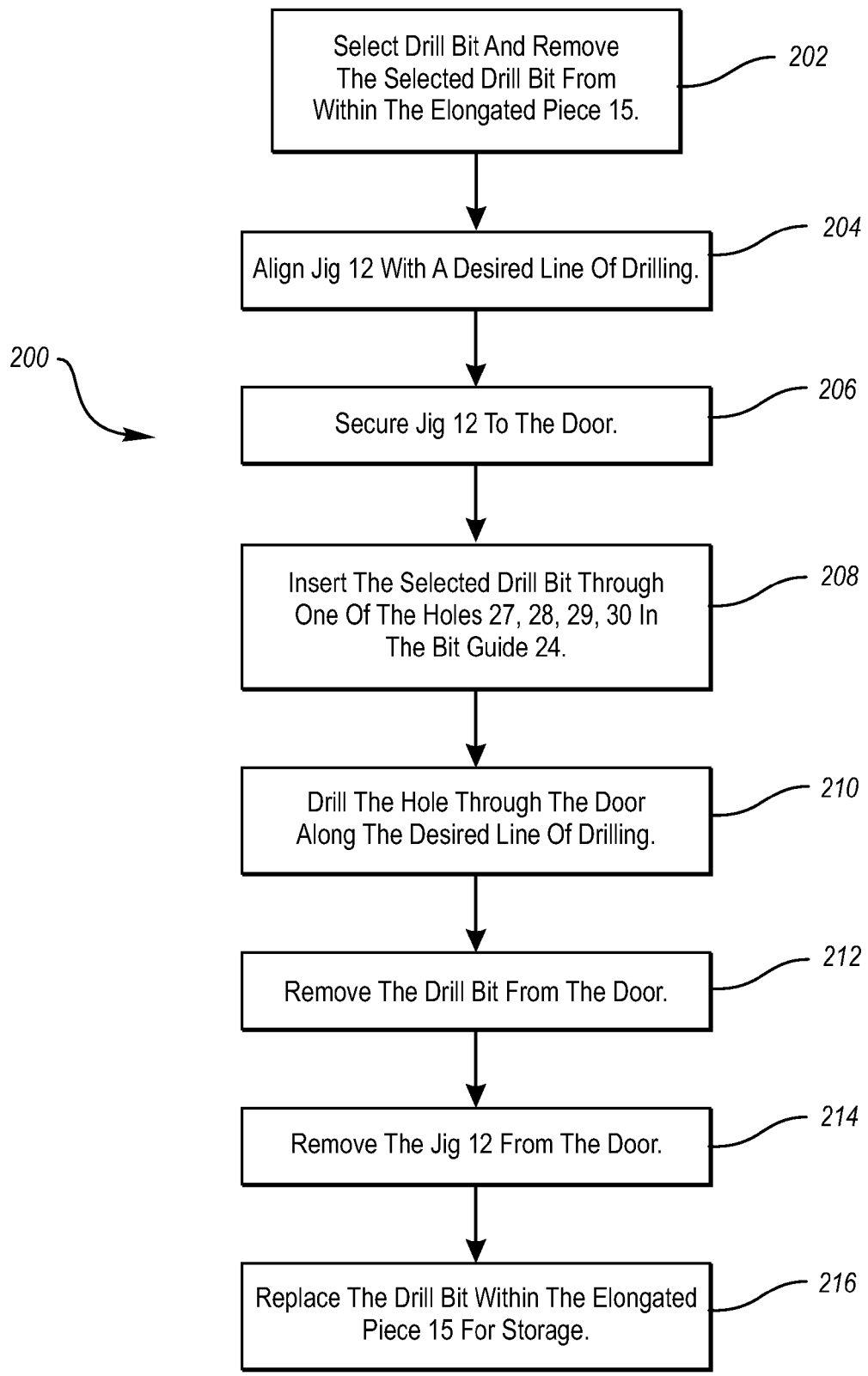
FIG. 10 is a flow chart illustrating a method of using the jig, in accordance with the present invention.

As shown in FIG. 10, a method 200 of using the jig 12 to drill a hole in a widthwise direction through a door includes step 202 of selecting a drill bit and removing the drill bit from within the elongate member 15 of the jig 12. Step 204 includes aligning the jig 12 with a desired line of drilling. Next, in step 206, the jig 12 is secured to the door. The step 206 of securing the jig 12 to the door includes inserting the jig securing elements 18 and 21 into through holes 35 and 36 in the elongate member 15 and turning a clamping knob 46 in a tightening direction so that the jig 12 is clampingly secured to the door. Then, the drill bit is inserted through one of the holes 27, 28, 29 and 30 in the bit guide 24 in step 208. In step 210, the hole is drilled through the door along the desired line of drilling. In step 212, the drill bit is removed from the door. In step 214, the jig 12 is removed from the door. The step 214 of removing the jig 12 from the door further includes turning the clamping knobs 46 of the jig securing elements 18 and 21 in a loosening direction and removing the jig securing elements 18 and 21 from the through holes 35 and 36 in the elongate member 15. Finally, in step 216, the drill bit is placed within the elongate member 15 of the jig 12 for storage.

The elongate member 15 is shown and described generally as being long in a direction corresponding to a width of a door. However, the elongate member 15 may be replaced by any member that may or may not be elongate. The member may be elongate in a direction other than the width of the door to which the jig is to be attached. The member need only have an aspect that may be aligned with a line to be drilled for perception by the user. For example, an inscribed line or score line on a member formed of sheet material could function in the same way and enable a user to align the through openings of the bit guide with the line.

It is to be understood that the bit sizes that may be used with the present invention are limitless. In a broad range the bit sizes may include sizes from one thirty-second of an inch to one and a half inches in diameter. In another range the bit sizes may range from one eighth to one inch in diameter. In still another range, the bit sizes may range from three sixteenths to three fourths of an inch in diameter. In still another range the bit sizes may range from one quarter inch to one half inch in diameter. Sizes of one quarter inch, five sixteenths inch, and three eighths inch are standard bit sizes that may be used in conjunction with the present invention. The through openings of the bit guide may be made to accommodate these sizes and any size within the ranges set forth above. The through opening diameters may be made to accommodate predetermined sizes within these ranges with or without liners or bushings.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:
1. A drill bit jig comprising:
a hollow elongate member having a longitudinal axis;
a first jig securing element;
a second jig securing element;
a drill bit guide protruding transversely relative to the longitudinal axis of the elongate member; and a guide line inscribed onto the elongate member, wherein the drill bit guide guides a drill bit through the work piece along the guide line during drilling, wherein the first jig securing element and the second jig securing element each comprise an L-shaped bolt wherein a first straight section of the bolt having a spacer and a threaded portion and a second straight section of the bolt is enclosed by a door protecting material, and wherein at least one of the first jig securing element and the second jig securing element comprises a position that is adjustable to accommodate work pieces of varying widths.

2. The jig of claim 1, wherein the door protecting material is configured to fit within a space between a hinged side of a door and a door jamb.

3. The jig of claim 2, wherein a width of the door protecting material is smaller than the space between the hinged side of the door and the door jamb.

4. The jig of claim 1, further comprising a plurality of through holes in the drill bit guide extending lengthwise in a direction generally parallel to the longitudinal axis of the elongate member.

5. The jig of claim 4, wherein at least two of the plurality of through holes in the drill bit guide have a different diameter.

6. The jig of claim 1, further comprising a through hole in a first end of the elongate member for receiving the first jig securing element and a plurality of through holes in a second end of the elongate member.

7. The jig of claim 6, wherein the second jig securing element is adjustable by being receivable in any one of the plurality of through holes.

8. A drill bit jig system comprising:
a hollow elongate member;
at least one drill bit that fits within the elongate member for storage;
two jig securing elements, wherein the two jig securing elements each comprise an L-shaped bolt wherein a straight portion of the L-shaped bolt is encased in a door protecting material;
a drill bit guide; and
a guide line inscribed onto the elongate member to align the drill bit jig with an opening in a door for a knob, wherein the guide line is viewable through the opening to ensure that a hole is drilled to the opening.

9. The system of claim 8, further comprising a protective filling material within the hollow elongate member.

10. The system of claim 9, wherein the protective filling material comprises at least one through hole and the at least one drill bit fits within the at least one through hole.

11. The system of claim 10, further comprising a plurality of drill bits of different thicknesses and a plurality of through holes in the protective filling material.

12. The system of claim 11, wherein the door protecting material is a generally rectangular piece configured to fit between a hinged edge of a mounted door and a door jamb.

13. A drill bit jig system comprising:
an elongate member;
at least one drill bit that fits within the elongate member for storage;
two jig securing elements, wherein the two jig securing elements each comprise an L-shaped bolt wherein a straight portion of the L-shaped bolt is encased in a door protecting material;
a drill bit guide; and
a guide line inscribed onto the elongate member, wherein the drill bit guide guides a drill bit through the work piece along the guide line during drilling.

14. The jig of claim 13, wherein the door protecting material is configured to fit within a space between a hinged side of a door and a door jamb.

15. The jig of claim 14, wherein a width of the door protecting material is smaller than the space between the hinged side of the door and the door jamb.

16. The jig of claim 13, further comprising a plurality of through holes in the drill bit guide extending lengthwise in a direction generally parallel to the longitudinal axis of the elongate member.

17. The jig of claim 16, wherein at least two of the plurality of through holes in the drill bit guide have a diameter different from each other.

18. The jig of claim 13, further comprising a through hole in a first end of the elongate member for receiving the first jig securing element and a plurality of through holes in a second end of the elongate member.

19. The jig of claim 18, wherein the second jig securing element is adjustable by being receivable in any one of the plurality of through holes.

* * * * *